United States Patent [19]

Walters et al.

[11] 4,436,604
[45] Mar. 13, 1984

[54] DESCALER FOR SYSTEMS EMPLOYING WATER AS A HEAT TRANSFER AGENT

[75] Inventors: Anthony J. Walters, 3305 Hazel La., Hazel Crest, Ill. 60429; Stanford C. Nelson, Park Ridge, Ill.

[73] Assignee: Anthony J. Walters, Hazel Crest, Ill.

[21] Appl. No.: 403,929

[22] Filed: Aug. 2, 1982

[51] Int. Cl.³ .............................................. C23F 13/00
[52] U.S. Cl. .................................. 204/196; 204/280; 204/290 R
[58] Field of Search ............... 204/147, 148, 196, 197, 204/280, 290 R

[56] References Cited

U.S. PATENT DOCUMENTS

| | | | |
|---|---|---|---|
| 160,009 | 2/1875 | Donoghue | 204/197 |
| 1,773,275 | 8/1930 | Neeley. | |
| 1,984,210 | 12/1934 | Gunderson. | |
| 2,499,670 | 3/1950 | Neeley | 122/4 |
| 2,893,938 | 7/1959 | Bremerman | 204/196 |
| 2,975,769 | 3/1961 | Bremerman | 122/4 |
| 3,406,110 | 10/1968 | Turnes et al. | 204/197 |
| 3,595,774 | 7/1971 | Bremerman | 204/196 |
| 3,891,530 | 6/1975 | Alewitz | 204/197 |
| 4,140,613 | 2/1979 | Inoue et al. | 204/196 |
| 4,147,607 | 4/1979 | Vollman | 204/196 |

*Primary Examiner*—T. Tung
*Attorney, Agent, or Firm*—Hill, Van Santen, Steadman & Simpson

[57] ABSTRACT

Electrolytic probe adapted for use in a heat transfer system, to ground the positive electrolyte of the water in the heat transfer system, and thereby prevent lime formation, scaling, pitting and corrosion, without the use of chemicals heretofore required to do this. The probe is supported to extend along the flow of water by a teflon seal threaded on the outer end thereof, and threaded within a fitting, threaded in a fitting secured to the inlet for the flow of water to perform its heat transfer operation. The means on the seal accommodating it to be threaded in the fitting are cut off after assembly, to preserve the seal between the probe and fitting.

3 Claims, 5 Drawing Figures

DESCALER FOR SYSTEMS EMPLOYING WATER AS A HEAT TRANSFER AGENT

BACKGROUND OF THE INVENTION

Electrolytic probes for the prevention of scaling, pitting and corrosion are shown and described in United States patent to Neeley U.S. Pat. No. 2,499,670, a United States patent to Bremerman U.S. Pat. No. 3,595,774 and others.

These probes have been used in boilers, condensors for refrigerators or air conditioners, in hot water heater systems and in association with the cooling jackets for compressors and other apparatus in which water is heated as it performs a cooling operation and effectively prevents lime formation, scaling, pitting and corrosion, and thereby eliminates the need for chemicals formerly required to do this.

With such prior art apparatus, it is difficult to support and seal the electrolytic probe, particularly when used in an internal combustion or diesel engine of a traveling vehicle, in such a manner that the probe will take the vibration of the device as traveling along a roadway without leakage, and prevent leakage particularly when utilized in association with the cooling system of an internal combustion engine driven traveling vehicle.

SUMMARY AND ADVANTAGES OF INVENTION

By the apparatus of the present invention, we provide a simple and improved electrolytic corrosion prevention device in the form of a probe particularly adapted for mounting in a flowing stream of water in which the probe is effectively insulated by its mounting means from the container or pipe through which the water or other coolant flows. The mounting means for the probe is further used as a seal and a hollow probe closed at its end and positioned in the flow of the fluid is further mounted in the mounting means to extend in the direction of flow of the fluid. The probe is hollow and has a closed end connected with a ground wire, passing through the mounting means and grounded to a suitable ground such as an engine block or mounting for the engine block, in cases where the probe is used in an internal combustion engine cooling system.

The electrolytic action of the probe is further enhanced by making the probe from a copper or brass tube and encircling the probe with a spiral copper wire extending diametrically from the periphery of the probe and brazed thereto to extend spirally along the length thereof. The periphery of the probe and wire together with the closed end of the probe are then plated with a material having a higher electrical conductivity than the brass, such as a silver or silver chromium plate.

Further, we thread the probe in a long lived insulating member which may be Teflon or another suitable material serving not only as an insulating member but as a seal and support to extend the probe from the end of the insulating member, and then thread the insulating member in an internally and externally threaded cylinder having an outer hex head which may be threaded in an internally threaded cylindrical fitting extending into an elbow or tee and welded or otherwise secured thereto.

A principal advantage of the invention is the provision of a more efficient electrolytic probe and mounting therefore in which the probe is of a highly electrically conductive material and mounted directly in contact with an electrolyte which may be a cooling fluid, such as water, to prevent liming, pitting, scaling and corrosion of a system utilizing the fluid as a heat conductor or coolant.

A further advantage in the invention is that the electrolytic probe may be effectively mounted in the flow of cooling water of an internal combustion engine and sealed and insulated from the conduit or other device through which the water flows and is then grounded, to provide a negative electrode, and draw off the electrical energy of the water, and thereby eliminates attraction of the electrolytic energy of the water, which would normally cause scale and heretofore making it unnecessary to use expensive chemicals to prevent scaling, pitting and corrosion of the system.

A further advantage of the invention is that the probe is readily removable from its mounting, to enable inspection and cleaning of the probe, and that the mounting for the probe effectively supports the probe in the flow of circulating cooling water, to provide a clean environment in the circulating system, free of harmful chemicals.

A still further advantage of the invention is the provision of an improved form of electrolytic probe for the cooling system of an internal combustion engine for a diesel locomotive, in which the probe is at the output of the water pump for coolant and is supported to extend in the direction of flow to the cylinder jacket of the engine, to prevent rust, scaling or corrosion heretofore prevalent in such cooling systems, without the use of harmful and costly chemicals.

A further advantage of the invention is that the electrical conductivity of the probe is increased by plating the probe with a metal of high electrical conductivity, such as a silver chromium plating.

The principal object of the invention, therefore, is to provide a simpler and more effective electrolytic probe than has heretofore been considered possible, which is particularly useful and rugged enough to be used in the cooling systems of internal combustion engines for locomotives or other vehicles.

A further object of the invention is to provide an improved form of electrical probe having a higher electrolytic conductivity than probes heretofore used, in which the mounting for the probe positively mounts the probe to extend along the flow of water and serves as an insulator and seal for the probe as well as a mounting means therefor.

These and other advantages of the invention will appear from time to time as the following specification proceeds and with reference to the accompanying drawings wherein:

DESCRIPTION OF THE DRAWINGS

In the embodiment of the invention illustrated in FIG. 1 of the drawings, we have shown a cooling system for the engine blocks of a diesel locomotive. As shown in FIG. 1, a storage tank 10 for coolant, such as water, is shown as connected to two water pumps 11 for supplying make up coolant to the respective engine blocks 12 of the diesel engine for the locomotive. Coolant is circulated through the system by the pumps 11,11 through the respective blocks 12,12 of the diesel locomotive engine, and passes from said blocks through radiators 13,13 and then along an oil cooler 14 to the intakes of the pumps 11,11. The system diagrammatically shown is conventional and the water tank 10 is provided to contain make up water which may be lost by overheating of the engines or leakage in the passage of water through the system.

The pumps 11,11 may be conventional power-driven vortex types of pumps in which the vortexes lead to outlets 17,17 connected with elbows 19,19 leading directly to the respective engine blocks 12,12 in a more or less conventional manner.

Figure 1:
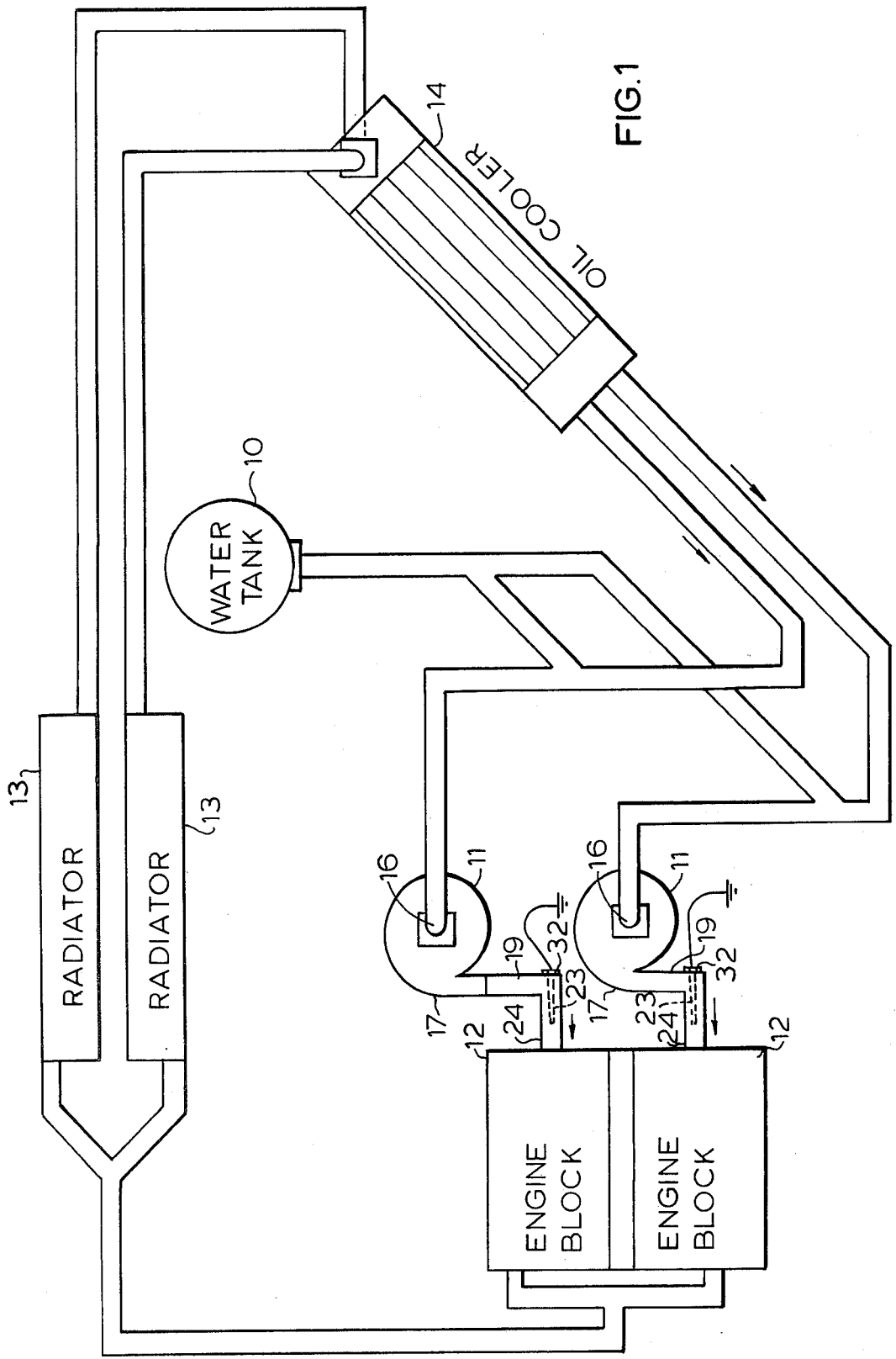
FIG. 1 is a diagrammatic view generally illustrating the cooling system of a diesel locomotive, showing a separate electrolytic probe extending along the respective coolant inlet for each block, at the discharge of an individual water pump into the engine block of the locomotive.
Figure 2:
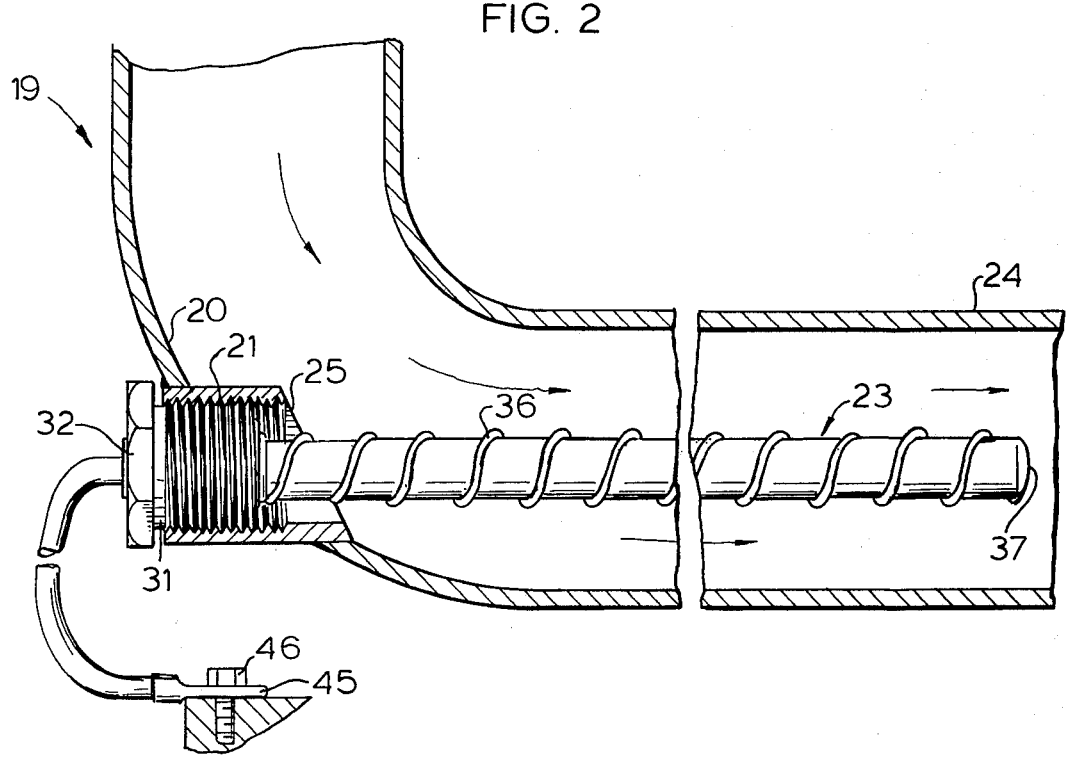
FIG. 2 is a longitudinal sectional view taken through the probe, showing the probe threaded in its insulating and sealing bushing, and showing the insulating and sealing bushing threaded in the supporting fitting for the probe, supporting the probe in the flow of fluid through the intake to the water jacket of one cylinder bank of a diesel locomotive.

Each elbow 19, as shown in FIG. 2, curves from a vertical to a horizontal plane and has an arcuate wall 20 having an internally threaded generally cylindrical fitting 21 for an electrolytic probe 23, shown as supporting said probe to extend along the axis of a horizontal inlet 24 for the respective engine block. The fitting 21 may be welded or otherwise secured to the curved wall 20 of the elbow 19 and as shown in FIG. 2 is cut-off at an angle within the fitting as generally indicated by reference numeral 25 to expose a maximum portion of the probe 23 to the coolant as flowing to a respective engine block (FIG. 1).

Figure 3:
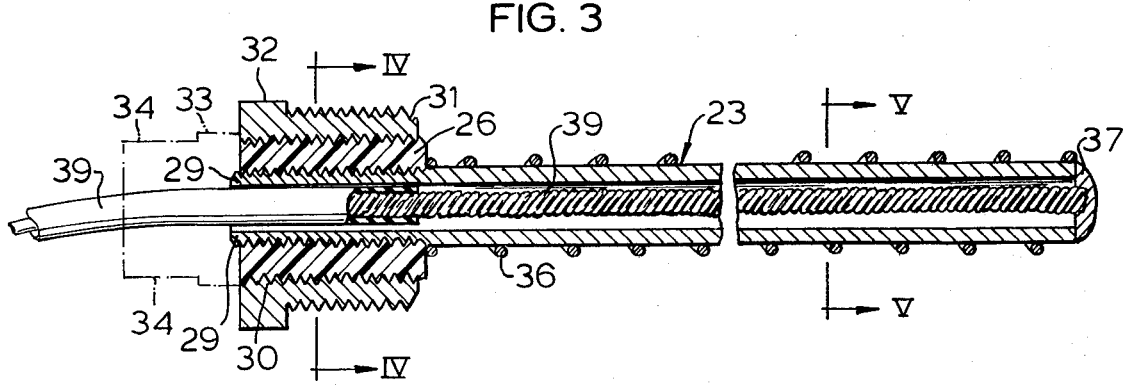
FIG. 3 is a transverse sectional view taken substantially along line III—III of FIG. 2.
Figure 4:
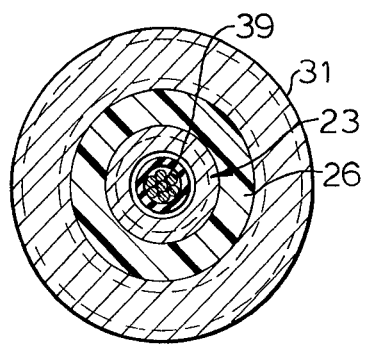
FIG. 4 is a transverse sectional view taken substantially along line IV—IV of FIG. 3.
Figure 5:
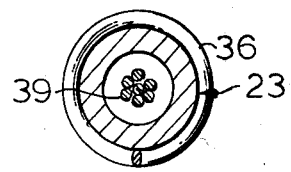
FIG. 5 is a transverse sectional view taken substantially along line V—V of FIG. 4.

The probe 23 is shown in FIGS. 3, 4 and 5 as being tubular and having an outer end 29 threaded in a bushing 26 which may be a Teflon or other similar bushing, Teflon being a prefered material for its rigidity, long life and sealing features. The bushing 26 is internally threaded and is threaded on the externally threaded end 29 of the probe 23, said bushing 26 also has an externally threaded surface 30 threaded within the cylindrical supporting retainer 31, which in turn is threaded within the internally threaded cylindrical fitting 21, which as previously mentioned is welded or otherwise secured to the elbow 19. The retainer 31 has an outer hex portion 32 to enable said retainer to be threaded within the fitting 21, to position the probe 23 to extend in the direction of the axis of the horizontal portion of the elbow 19 and to accommodate removal of said probe from said elbow when it is desired to inspect or clean said probe.

The bushing 26 initially has an axially projecting boss 33 having diametrically opposed flats 34 extending along an exterior extension thereof to accommodate threading of said bushing within the internally threaded wall of the supporting retainer 31 by a wrench or the like. The boss 32 is cut off flush with the outer surface of the nut 31 when the probe is threaded within said bushing and said bushing is threaded within the retainer 31.

The outer end of the support and retainer 31 is of a hex configuration as indicated by reference numeral 32 to form in effect a nut integral with said retainer, which may insert the retainer and probe within the threaded portion of the internal wall 20 of the fitting 21.

The bushing 26 having no place for gripping by a wrench cannot be removed from the probe 23 or the fitting 32, and the sealing qualities of the bushing are always retained.

The tubular probe 23 may be made of copper or red brass which is comparable to copper alloy No. 230. One material suitable for the probe contains 84.69 percent copper; 0.001 percent phosphorus; 0.01 percent lead and 15.25 percent zinc.

It should be understood, however, that are foregoing constituency of the probe need not be adhered to but the probe may be made from pure copper or other forms of copper alloy classified by those skilled in the art as brass.

The primary aim is to provide a probe having high electrical conductivity qualities and to enhance these qualities by plating the probe with a silver chromium solution, and to further increase the conductivity of the probe by spirally coiling and brazing a copper wire 36 to the surface of the probe to extend along the length of the portion of the probe exposed to the flow of water through the cooling system. The spiral wire 36 may be brazed to the outer surface of the probe and extend for the length thereof and may be silver plated as the probe is silver plated. The extreme inner end of the probe is closed by brazing to form an end closure 37 for the probe and in the brazing operation an extreme inner end of a ground wire 39 is brazed to the inside of the closure 37, as closing one end of the probe.

The ground wire 39 may be an insulated wire with the insulation removed at the inner end thereof. As shown in FIG. 3, however, the insulation extends within the probe to a point adjacent the inner end of the bushing 26, but may extend adjacent but spaced from the point of brazing of the wire to the end closure 37. The ground wire 39 may then be connected to a suitable ground which may be the engine block where the probe is applied to a diesel locomotive or to any other suitable place in the system, which will give a good ground. As shown in FIG. 2, a connector 45 is on the end of the ground wire outside the probe and is secured to ground as by a machine screw 46.

In a typical diesel engine installation as illustrated in the drawings, the probe 23 may first be threaded in the bushing 26 for the length of the bushing. The probe with its end closed and the spiral copper wire extending therealong and brazed thereto may then be silver plated, to increase its electrolytic conductivity. The spiral wire 36 is first brazed to extend along the periphery of the probe as the end of the tubular probe is closed. The probe and wire are then plated with a silver plate which may have chromium added to reduce tarnishing of the probe. The probe may then be mounted in the bushing 31 by threading through the Teflon retainer 26. The Teflon retainer and seal 26 may be threaded on the threaded outer end portion of the probe prior to the installation of the probe in the bushing 31 by threading the retainer 26 within the bushing 31. The retainer 26 may then be cut off flush with the outer face of the nut or hex portion 32 of the retainer 31 to permanently mount the probe in said retainer 31. A wrench may then be applied to the hex head of the hex portion 32 of the retainer 31 to thread the retainer within the cylindrical wall of the fitting 21 and thereby mount the probe to extend along the axis of the horizontal portion of the elbow 19 and positively secure the probe thereto. The ground wire 39 may then be secured to ground as by a cap screw 46 extending through a connector 45, and threaded in the engine block, it being understood that the connector 45 has electrical contact with the engine block or other suitable ground to effectively ground the probe 23 and thereby remove all dynamic electric energy from the cooling water and prevent an electroplating action between the water and the metal of the elbow 19 or other vessel in which the probe may be mounted.

The electro-plating action that would take place between the water containing electrolyte during operation of the engine without installation of the probe is what causes scale formation and pitting caused by the electric energy passing through the electrolyte in solution.

The installation of the probe, however, grounds all dynamic electric energy from the water and as previously mentioned, eliminates the electro-plating action that would normally take place between the water and the metal of the vessel or pipe along which the probe extends and thus eliminates the formation of scale or pitting and also removes any old scale in the system.

The action of the probe and removal and prevention of scale lime formation, pitting, etc., may be compared to the action of an electromagnet in which the magnetic energy of the magnet is produced by the passage of electric current through the metal, but which looses its magnetism when the current stops.

A metal boiler or the metal of a cooling system may be compared in an electromagnet because of the negatively and positively charged electrolyte in liquid solution. This sets up the electric energy necessary to produce the electromagnet. Upon installation of the probe as described herein, all of the electrolytic energy of the water is grounded out of the water and in effect the current necessary to build up any magnetism is stopped.

When the current is stopped in an electromagnet, it is apparent that all holding power of the electromagnet is gone and the material which has been attracted to the electromagnet by magnetism will fall away.

This same action takes place in any metal vessel in which there is water containing electrolyte by installing the electrolytic probe 23 in the vessel and positively grounding the probe and thereby grounding out all electric activity in the water and the chemical decomposition necessary to produce free oxygen and free hydrogen in solution, which agents are primarily responsible for pitting and corrosion.

By taking the electrolytic energy out of the water when in a container such as a pipe, boiler or other apparatus to which the probe may be applied, the electric energy being grounded, there is no electric energy to reach the metal across oxygen bubbles which form on the inner side of the container and thereby cannot conduct electric energy, which is simply a void through which the current might travel. Normally, the oxygen would convert the spent metal to a black liquid, leaving a corrosive pit which is positively prevented by the electrolytic probe of the present invention.

The electrolytic probe simply stated drains the electric energy off or grounds it out of the water so that there cannot be any electrolytic action, and equating the electrolytic action to an electromagnet, the electromagnet is de-energized and has no force available to attract the metal.

We claim as our invention:

1. An electrolytic scale inhibiting device for cooling systems employing water as a heat transfer agent comprising:

a closed heat transfer circuit along which cooling water flows and including at least one inlet pipe, an internally threaded fitting extending into said inlet pipe and permanently secured thereto, an electrolytic probe in the form of a hollow copper tube removably secured to said fitting and sealed thereto and extending axially along said inlet pipe, said probe having a spiral copper wire brazed to its exterior surface and extending therealong to the inner end of said probe, a copper end closure for the end of said probe, a ground wire secured to said end closure and extending along said probe through the outer wall end thereof, said ground wire being insulated in the region of said fitting and extending outside of said probe and having a free end outside of said heat transfer circuit connected to ground, sealing and insulating means mounting said probe in said fitting, comprising an insulating bushing threaded on the outer end of said probe, the mounting for said probe in said fitting also including an internally and externally threaded retainer threaded within said fitting and having said bushing threaded therein, said retainer having a head that can be gripped by a wrench and said sealing and insulating bushing being threaded within said retainer and cut-off flush with the outer end of said bushing when assembled to said retainer, to provide a permanent water tight insulation and sealing support between said retainer and probe.

2. The electrolytic scale inhibiting device of claim 1 wherein said probe, the spiral wire extending therealong, and said end closure, are coated with a silver chromium plate.

3. The electrolytic scale inhibiting device of claim 2 wherein the sealing and insulating bushing is formed from Teflon and supports said probe in said inlet pipe to extend axially therealong and provides a resilient support for said probe, accommodating the use of said probe in a mobile cooling system such as the cooling system of a diesel locomotive and like vehicle.

* * * * *